United States Patent
Zhang (10) Patent No.: US 10,309,861 B2
(45) Date of Patent: Jun. 4, 2019

(54) INTELLIGENT PIPELINE SMALL LEAKS AND THEFTS DETECTION METHODS AND SYSTEMS

(71) Applicant: Yan Zhang, Richmond (CA)

(72) Inventor: Yan Zhang, Richmond (CA)

(73) Assignee: Pro-Fin Engineering Inc., Richmond BC (CA)

( * ) Notice: Subject to any disclaimer, the term of this patent is extended or adjusted under 35 U.S.C. 154(b) by 339 days.

(21) Appl. No.: 15/443,658

(22) Filed: Feb. 27, 2017

(65) Prior Publication Data

US 2018/0246004 A1    Aug. 30, 2018

(51) Int. Cl.
*G01M 3/24*    (2006.01)
*G01M 3/28*    (2006.01)

(52) U.S. Cl.
CPC .......... *G01M 3/243* (2013.01); *G01M 3/2815* (2013.01)

(58) Field of Classification Search
None
See application file for complete search history.

(56) References Cited

U.S. PATENT DOCUMENTS

| | | | | |
|---|---|---|---|---|
| 3,505,513 A | * | 4/1970 | Fowler | G01F 1/00 340/605 |
| 3,851,521 A | * | 12/1974 | Ottenstein | F17D 5/06 137/14 |
| 4,280,356 A | * | 7/1981 | Stewart | G01M 3/2807 73/40.5 R |
| 4,308,746 A | * | 1/1982 | Covington | G01M 3/2807 340/605 |
| 5,272,646 A | * | 12/1993 | Farmer | G01M 3/2815 340/605 |
| 8,479,566 B2 | * | 7/2013 | Haseloh | G01M 3/2815 73/40.5 R |

* cited by examiner

*Primary Examiner* — Paul M. West
*Assistant Examiner* — Mark A Shabman (57) ABSTRACT

Methods and systems are provided for intelligently detecting pipeline small leaks and thefts. In the Energy Flow Line Method, measured changes in flow data at both ends of the pipeline are monitored and analyzed to detect a leak or a theft. The energy wave front speed and the unsteady flow mathematical model of the subject pipeline is used to calculate leak details. In the Filtered Pressure Waves Method, the measured pressure data at both ends of the pipeline is monitored and analyzed. Pressure waves that do not originate at the ends of the pipeline are selected. Two travelling time windows are applied to those candidates, and the candidates are processed within each window. Leaks, thefts and their details are obtained if the detected leak locations meet the criteria. The Enhanced Filtered Pressure Waves Method, provides the leaked amount and verifies the leak and the leak location to avoid false alarms. An index formed with measured parameters is monitored and the unsteady flow model of the subject pipeline is utilized.

6 Claims, 1 Drawing Sheet

INTELLIGENT PIPELINE SMALL LEAKS AND THEFTS DETECTION METHODS AND SYSTEMS

BACKGROUND OF THE INVENTION

1. Field of the Invention

This invention pertains to methods and related systems for intelligently detecting pipeline small leaks, thefts and their details.

2. Description of the Prior Arts

Pipeline leaks may cause disasters to the environment and huge costs to the owners in addition to the loss of the productions. Most leaks begin with small ones, which however are difficult to detect and most leak detection systems are not aiming at. As the results, most leaks discovered are big. If those leaks could have been detected when they were small or as early as possible, so that actions can be taken as early as possible, the leak impacts will be reduced tremendously.

Compared to traditional pipeline leaks, pipeline thefts may impose little threaten to the environment but great challenges to leak detection systems, because:

1) The theft flow is normally at a very low rate in order not to be detected by leak detection systems;
2) The theft tapping site may have no leaked fluids in order not to look suspicious and not to be detected by environmental monitoring methods;
3) The theft extraction may be off for some period of times, making leak detection systems confused.

Although leaks are normally developing with time irreversibly and getting larger, thefts and small leaks may be indistinguishable if the theft extraction is on. The event of a theft valve closing is actually the unique reliable feature to distinguish thefts from small leaks. Therefore in this document, a theft will be described as a leak until its theft valve closing event is identified.

Apparently, if a leak detection system can detect small leaks, it can always detect larger leaks. In order to detect pipeline thefts, a leak detection system shall be able to detect very small leaks and find leak details, such as the theft valve closed time; while being sensitive to detect small leaks, it should be also intelligent to avoid sending false alarms.

Methods to detect pipeline leaks and leak details can be classified as two categories: (A) externally, to detect the presence of the leaked fluid along the subject pipeline; (B) internally, to analyze the measurements taken from inside of the subject pipeline.

The category (A) is normally referred to as environmental monitoring methods. Apparently for pipeline thefts, environmental monitoring methods may not work at all, because to avoid looking suspicious, there may be no leaked fluids at a pipeline theft site at all.

There are 2 subcategories in the category (B): (a) to analyze the measurements of the common fluid parameters (that is, pressure, temperature, flow, density and so on); (b) to analyze the other measurements, such as ultrasonic etc. Hereafter only methods in subcategory (a) will be discussed.

There are many methods in subcategory (a), and these methods can be divided into 4 groups.

The first group is to compare meter variance, that is, the reading difference between the fluid metered into and out of the subject pipeline. These methods are referred to as material balance methods (or volume balance methods, if the reading to be compared is a volume flow instead), which are described in the U.S. Pat. No. 3,505,513 A (filed in 1968) to Fowler Michael Lawrence, et al. There are also some variances developed, referred to as compensated material (or volume) balance methods.

Theoretically if the whole pipeline is in a steady flow condition, its reading losses indicate a leak. However, the flow is basically unsteady, and meters never completely agree. To reduce errors, operation requirements for using such material balance methods have been recommended in current industry standards, for instance, in CSA standards Z662-11 for LVP, HVP transmission or HVP gathering applications.

Although this group of methods can identify small fluid loss through some carefully designed procedures, they cannot estimate leak locations and other leak or theft details. Besides, it takes long time to confirm a leak. These 2 major drawbacks often delay emergency responses to hazardous spills or leaks if detected with this group of methods.

The second group of the methods is to estimate leak locations based on the concept of the wave propagation time difference. When a leak happens, it generates an expansion wave in the fluid of interest travelling towards both inlet and outlet end of the pipeline. The difference of wave propagation time when the wave arrives at sensors at upstream and downstream of a leak can be used to calculate the leak location (the point of wave origin). Such method is described for liquid in the U.S. Pat. No. 3,851,521 A (filed in 1973) to Sidney Allan Ottenstein, and more details for fluids in the U.S. Pat. No. 5,272,646 (filed in 1991) to Edward J. Farmer. Methods based on such concept are normally referred to as the pressure point analysis methods.

In reality, there are some practical limitations that make this group of methods not worked well. The first significant limitation is how to detect an expansion wave front, since the pressure at a sensor is generally the overall result of all the waves travelling by in the subject pipeline.

The second significant limitation is that since all the waves are travelling in the subject pipeline, how to be sure that the received expansion wave is really from a leak. Conceptually, this could be solved with 2 pairs of sensors installed at different locations (referred to as detecting stations, or monitoring locations in those patents) in the way that ideally two at upstream of the leak, two at downstream of the leak, plus to record signals continuously so that the V shape trajectory of the initial expansion wave travelling could be identified. However continuously recording signals becomes impractical when in SCADA environments, where data received by MTU are actually discrete with a predetermined rate (SCADA polling rate). Besides, this solution cannot be implemented to most existing pipelines, where it may be practical to only install 2 groups of sensors (that is, at the inlet and the outlet end of the pipeline).

The third significant limitation is that because signals received are discrete when used in SCADA environments, sometimes it is very difficult to determine the wave propagation time differences. For instance, if the SCADA sensor polling cycle interval is long enough, such as 15 seconds, it would be possible that between the two sensors at upstream and downstream of the leak, only one of them received the initial expansion wave originated by leaking, while the other sensor received may be a different expansion wave (not the initial one), resulting in possibly huge error when calculating the leak location based on wave propagation time difference.

The fourth significant limitation is the way this group of methods detects leaks. For instance, in the U.S. Pat. No.

3,851,521 A (filed in 1973) to Sidney Allan Ottenstein, a reference signal corresponding to the normal pressure in the line is used to compare with. A leak in the line is detected by a change relative to the reference signal at each detecting station as the negative pressure wave reaches that detecting station. However for the unsteady flow in a pipeline, the pressure may be fluctuated, which makes the method work well only when the pressure in pipeline can be represented with that normal pressure.

In the U.S. Pat. No. 5,272,646 (filed in 1991) to Edward J. Farmer, such reference signal was substituted with many baselines, which are a lot of characteristics obtained before and after previous leaks. A leak will be determined if the characteristics received does not match any baseline stored. Such requirement makes an application very complicated. And still so obtained baselines may not cover the characteristics of all possible future leaks. Besides, this group of methods cannot tell if there is any pipeline theft.

The third and fourth groups of the methods are to use real pipeline measurements to compare with a profile representing status in the subject pipeline with no leak. Deviations from the profile will be considered as a leak.

If such profile is generated with complex computer-based models, it is the third group of methods, and normally referred to as the real time transient model (RTTM) method, which is described in the U.S. Pat. No. 4,280,356 A (filed in 1979) to Thomas L Stewart, and in the U.S. Pat. No. 4,308,746 A (filed in 1979) to Morris T. Covington.

If such profile is obtained with pressure sensors when there is no leak, it is the fourth group of methods, and normally referred to as the statistical analysis method, which is described in the U.S. Pat. No. 8,479,566 B2 (filed in 2009) to Peter Haseloh and Donald LaFleur.

Among differences between RTTM methods and statistical analysis methods, the major one is that the profile in RTTM method covers unsteady flow, and provides pressure and flow and more calculated information at various verifying locations (where sensors are installed) if a RTTM well represents the reality. While the profile used in statistical analysis method is basically obtained under steady flow condition at various verifying locations. If both groups of methods are applied to the same pipeline, and their verifying locations are the same, a statistical analysis method could be considered as a simplified case of a RTTM method, if this RTTM well represents the reality.

Conceptually, if the profile provided is correct and the verifying locations are closely arranged, operators can use these methods to infer leaks and leak details. For instance, by identifying where and when a deviation from the profile happens, the leak location should be within the vicinity, and the leak started time should be also close to the time when the deviation observed. However in reality, it is much more complicated and these methods are not worked well and produce a lot of false alarms.

Firstly, it is difficult to learn and use such methods for unsteady flow conditions where the representativeness of the profile is in question. It becomes very challenging to interpret all kinds of deviations from the profile in order not to send false alarms.

Secondly, the validity and the accuracy of the methods, for instance in detecting the leak location and leak details with such methods, are heavily reliant on the distance of the verifying locations across a leak location. In order to reduce the error, the distance between verifying locations along the pipeline should be close enough, which makes the system very expensive, especially for a very long pipeline. Otherwise the error could be substantial. For instance, the patent claims that "the spacing between said various locations varies from about 5 miles to about 100 miles" (the claim 5 of U.S. Pat. No. 4,280,356 A). For a 100 mile spacing across the leak, the error in detecting leak location could be as much as 50 miles.

Thirdly, these groups of methods cannot be implemented to an existing pipeline, where only inlet and outlet modifications are practical. In such situation where no verifying location could be arranged between the inlet and the outlet, the performances of these groups of methods would be similar to that of a material balance method, that is, the leak details such as leak location etc. cannot be estimated.

Lastly, these methods have difficulties to detect small leaks and pipeline theft. Being sensitive for small leaks may send a lot of false alarms.

The present invention is made to overcome all these drawbacks listed above.

DESCRIPTION OF THE INVENTION

1. Summary of the Invention

Four (4) methods and systems that utilize these methods are claimed in the present invention for intelligently detecting pipeline small leaks, thefts, and their details. For the hardware, all these 4 methods require at least both groups of required sensors installed separately at the inlet and the outlet end of the pipeline and integrated into the working environment (for instance, a SCADA environment) to provide measured fluid parameters, such as pressure, temperature, mass flow etc., and the timestamps indicating when these fluid parameters were measured. For the software, if not all, at least three of the four methods require the unsteady flow mathematical model constructed to utilize the 3D centerline profile of the subject pipeline (can be simplified as 2D centerline profile in some applications).

In the Energy Flow Line Method, the measured flow data at both ends of the pipeline will be monitored and analyzed. If sudden and sustained flow changes in opposite direction (absolute changes to be more than a pre-set strength threshold and duration to be longer than a pre-set duration threshold) are identified at different ends of the pipeline within the given time frame (which is about the time for an energy wave section to flow from the inlet to the outlet of the pipeline), a leak or a theft is detected. The energy wave front speed is introduced, and the leak details are calculated with utilizing an unsteady flow mathematical model of the subject pipeline. The initial expansion pressure wave originated by the leak is used together (see FIG. 1 for illustration) to locate the leak. Similarly the final compression pressure wave originated by the theft valve closing is used together to locate the theft. Since the system response times and flow change capacities of a pump or a compressor to expansion waves and compression waves from a leak or a theft are used in this method, the system test may be necessary to quantify such system features. This method is particularly suitable for detecting small leaks, thefts and their details. And the minimum leak that can be detected with this method should be determined basically by the hardware of the system.

In the Filtered Pressure Waves Method, the measured pressure data at both ends of the pipeline will be monitored and analyzed. After filtering, only those pressure waves that are not originated at the ends of the pipeline will be selected as candidates. The travelling time windows for pressure waves and the 2 travelling time windows templates are used for leak detection. For each computation step, consecutively apply the 2 travelling time windows template 1 and template 2 to those candidates, see FIG. 2 for illustration, and process those candidates within each window to have the estimated leak locations. Leaks, thefts and their details (except for leaked amount) can be obtained if the detected leak locations in a template are within a pre-set tolerance. Leaks or thefts can also be detected when fluid is stagnant for some time. This method can work with or without using the unsteady flow mathematical model of the subject pipeline. If not using the unsteady flow mathematical model, the required sensors can be simplified to have pressure sensors only; if using the unsteady flow mathematical model, more accurate estimated leak locations can be obtained.

The Enhanced Filtered Pressure Waves Method, as the name suggests, is the enhanced version of the Filtered Pressure Waves Method if the fluid is not stagnant for some time. The essential part of the Energy Flow Line Method is used to extend the function not only to provide the leaked amount, but also to verify the leak and the leak location in order to avoid sending false alarms. The measured flow data at the outlet end of the pipeline is also monitored and the unsteady flow mathematical model of the subject pipeline is utilized. If the fluid is stagnant for some time, the leaked amount will be calculated without measured data to be compared, and this method will function as same as the Filtered Pressure Waves Method in Claim 2 since the enhancement requires flow data. The leak location will be provided with a search range.

In the Mutual Confirmation Method, essential parts of the above 3 methods are utilized to extend the capability and to confirm each finding. If any result that contradicts the solution is identified, find a new one that fits. By providing the solution that is mutually confirmed with 2 sets of leak details, sending false alarms can be avoided. Although all these methods can work in different environments, this method is particularly developed to solve some issues in the real time monitoring applications, especially in SCADA environments, to have shorter calculation times. The unsteady flow mathematical model of the subject pipeline is indispensable for this method. If the fluid is stagnant for some time, the leaked amount will be calculated without measured data to be compared. The leak location will be provided with a search range.

The present invention is suitable for most pipeline applications, including very long pipelines (for instance, over 200 km), existing pipelines (with min or no modification or existing sensor groups), and pipelines that need to be shut for some time (excluding using the Energy Flow Line Method), and easily used as a cross checking tool to other pipelines and other online leak detection systems. The fluids in pipelines can be gases, liquids, and multi-phase fluids.

2. Description of Preferred Embodiments

The four methods and related systems claimed in the present invention have some features in common. To be clear, their preferred embodiments will be described here in 2 portions: the common description which is good for all four claimed methods; and the specific description which is basically particular to each different claimed method.

I. The Common Description for all Four Claimed Methods

All four methods and related systems can work in both SCADA and non-SCADA environments.

The requirements of the four methods on the hardware are basically the same. That is, the hardware at least includes 2 groups of required sensors that are separately installed at the inlet and outlet end of the pipeline and integrated into the working environment (for instance, a SCADA environment). There can also be more groups of required sensors and one flow control valve installed separately in between the two required groups at the ends of the pipeline.

These required sensors in a group are to provide simultaneously measured fluid parameters, and the timestamps indicating when these fluid parameters were measured. The measured parameters required normally include pressure, temperature, mass flow (or volume flow for liquid), density, as well as the composition for multi-phase fluids. However, the number of "required sensors" can be reduced for different methods and applications.

The requirements of the 4 methods on the software are similar. Firstly, they all need to analyze the measured data acquired with those sensor groups. Secondly, if not all, at least 3 of the 4 methods require an unsteady flow mathematical model of the subject pipeline, which is constructed to utilize the 3D centerline profile of the pipeline (can be simplified as 2D centerline profile in some applications).

The unsteady flow mathematical model required in these methods may consist of one or more model pipeline sectors. Each model pipeline sector is constructed to utilize details of the fluid that are transported, the pipeline material and configuration, flow dynamics, heat transfer, and particularly the 3 dimensional centerline profile of the subject pipeline sector (may be simplified as a 2 dimensional centerline profile in some applications).

The multi-pipeline sectors model is for the application where there are more groups of required sensors installed separately in between the two required groups at the inlet and the outlet end of the pipeline. Generally speaking, choosing to utilize the multi-pipeline sectors model may improve the accuracy with the cost of slowing down the process. Therefore in such applications, whether to have only one model pipeline sector, or to have as many model pipeline sectors as chosen to match the reality, or in any combination in between, is up to pipeline operator's preference, as long as each model pipeline sector has two groups of the required sensors separately installed at the "inlet" and "outlet" ends of the subject pipeline sector, which means that those intermediate pipeline sectors will share their sensor groups.

Pipeline small leaks, thefts, and their details, can be detected by running the software of any one of the four methods in either one of the following two running modes:

1) Real Time Monitoring—the software will be run continuously and concurrently with the real pipeline operation. At each computation step or SCADA polling interval the fluid parameters measured by the groups of sensors are read and processed. The Real Time Monitoring mode is the recommended way to monitor the pipeline integrity because leaks, thefts and their details will be detected earlier in this running mode than in the Data Post Processing mode.

2) Data Post Processing—the software will be run in an unsynchronized way with the real pipeline operation. The fluid parameters measured by the groups of sensors in the past are saved in data backup files, which can be processed at any preferred time by running the software in this Data Post Processing mode. Leaks, thefts and their details will be detected as if in the Real Time Monitoring mode except that the displayed "current time" of the events is actually in the past. This mode can be used to analyse, replay and verify etc., and also can be run for checking different pipelines.

To be general, the terminology computation step is used to describe the nominal time interval between the two chronologically consecutive sets of the measured parameters of the whole pipeline. In a SCADA environment the computation step is equal to the SCADA polling cycle interval.

The methods are suitable for most pipeline applications, including very long pipelines (for instance, over 200 km), existing pipelines (with min or no modification on existing sensor groups), and pipelines that are shut for some time (excluding using the Energy Flow Line Method), and easily used as a cross checking tool to other pipelines and other online leak detection systems. The fluids in pipelines can be gases, liquids, and multi-phase fluids.

II. The Specific Description for Each Different Claimed Method

If any unexplained terminologies encountered in the description below for individual method, please refer to the corresponding claim. For the convenience in expression, hereafter the leak location is defined as the distance from the leak along the pipeline to the sensor group at the inlet end of the subject pipeline.

i. For the Energy Flow Line Method in Claim 1

For this method, system test may be needed to quantify some system features, such as system response times and flow change limitations to expansion pressure waves and compression pressure waves.

Figure 1:
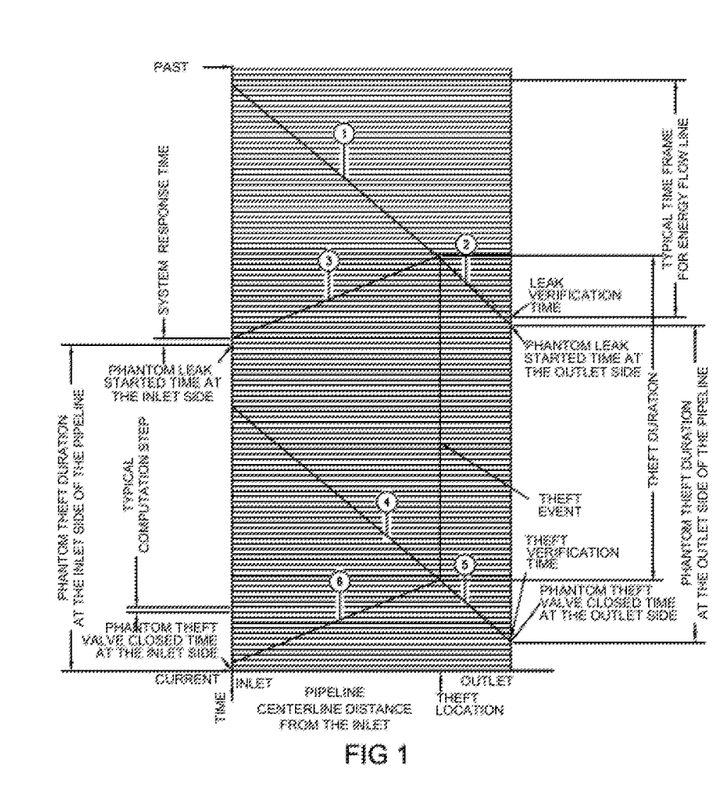
FIG. 1 is an illustration of the basic concepts of the Energy Flow Line Method (in Claim 1) applied to a theft case for a horizontal pipeline with equal internal diameter.

Small leaks, thefts and their details can be detected with the following steps (also see FIG. 1):

1) Monitor and analyze the measured flow data at both ends of the pipeline to identify sudden and sustained flow changes in opposite direction (absolute changes to be more than a pre-set strength threshold and duration to be longer than a pre-set duration threshold) at different ends within the given time frame (which is about the time for an energy wave section to flow from the inlet to the outlet of the pipeline);

2) Once identified, the following two results are important:
   a. If the outlet end flow decreases, but the inlet end flow increases, it denotes a leak, or a theft valve (including a branch valve) opening event. The times corresponding to the beginning of such sudden and sustained flow changes at the inlet and the outlet end are named as the phantom leak-started-time at the inlet and at the outlet side respectively;
   b. If the outlet end flow increases, but the inlet end flow decreases, it denotes a theft valve (including a branch valve) closing event. The times corresponding to the end of such sudden and sustained flow changes at the inlet and the outlet end are named as the phantom theft-valve-closed-time at the inlet and at the outlet side respectively.

3) For a leak case, the estimated leak details will be determined as following:
   a. The first leaking energy flow line for a new leak is defined as the earliest energy flow line that is affected by this new leak. Ideally this first leaking energy flow line for the new leak will pass its leak location at the leak-started-time, and also pass the outlet sensors at the measured phantom leak-started-time related to this new leak at the outlet side of the pipeline;
   b. The first expansion pressure wave originated by this new leak started at the leak-started-time will pass the inlet sensors and reach the pump or the compressor. After the system response time to the expansion pressure waves the inlet sensors will detect the pump response or the compressor response to the first expansion pressure wave at the measured phantom leak-started-time at the inlet side of the pipeline;
   c. By tracing back these two lines (the first leaking energy flow line and the trajectory of that first expansion pressure wave), the intersection of these two lines is the estimated leak location for this new leak;
   d. The time corresponding to this intersection (the estimated leak location) is the estimated leak-started-time for this new leak.
   e. The time that the first leaking energy flow line is supposed to pass the outlet sensors of the pipeline if without being affected by the new leak is defined as the leak verification time. The time difference between this leak verification time and the measured phantom leak-started-time at the outlet side indicates how large is the new leak and how far away is the new leak, and can be used to verify the leak if the estimated and the measured phantom leak-started-time at the outlet side are within a pre-set tolerance;
   f. The leaked fluid will be the accumulation of each measured flow difference between the two ends of each energy flow line that passes the outlet sensors after the measured phantom leak-started-time at the outlet side of the pipeline. Because the leak-started-time could be much earlier than the phantom leak-started-time at the outlet side of the pipeline, the total leaked amount can be adjusted once the leak-started-time is available.

4) For a theft case, the estimated theft details will be determined as following:
   a. The last leaking energy flow line for a new theft is defined as the latest energy flow line that is affected by this new theft. Ideally this last leaking energy flow line for the new theft will pass its theft location at the theft-valve-closed-time, and also pass the outlet sensors at the measured phantom theft-valve-closed-time related to this new theft at the outlet side of the pipeline;
   b. The last compression pressure wave originated by this theft valve closing ended at the theft-valve-closed-time will pass the inlet sensors and reach the pump or the compressor. After the system response time to the compression pressure waves, the inlet sensors will detect the pump response or the compressor response to the last compression pressure wave at the measured phantom theft-valve-closed-time at the inlet side of the pipeline to this new theft;
   c. By tracing back these two lines (the last leaking energy flow line and the trajectory of that last compression pressure wave), the intersection of these two lines is the estimated theft location for this new theft;
   d. The time corresponding to the intersection (the estimated theft location) is the estimated theft-valve-closed-time for this new theft;
   e. The time that the last leaking energy flow line is supposed to pass the outlet sensors of the pipeline if without being affected by the new theft is defined as the theft verification time. The time difference between this theft verification time and the measured phantom theft-valve-closed-time at the outlet side indicates how large is the new theft and how far away is the new theft, and can be used to verify the theft if the estimated and the measured phantom theft-valve-closed-time at the outlet side are within a pre-set tolerance.

f. The leaked fluid will be the accumulation of each measured flow difference between the two ends of each energy flow line that passes the outlet sensors during the phantom theft-duration, for which the measured data is only between the phantom leak-started-time and the phantom theft-valve-closed-time at the outlet side but the length should be the difference between the theft verification time and the leak verification time.

5) After a leak (including a theft or a branch valve opening) is detected, if the discharge flow increase of the pump or the compressor is clearly smaller than its tested capacity to respond leaking related expansion waves, this method is still capable to detect more new leaks as following:
  a. If the detected new leak has a different leak location, then it is a new leak. Its leak details can be obtained except that the flow sensors can only measure the overall flow;
  b. If the detected new leak has the same leak location as the previously detected one, then it denotes that the previously detected leak has become larger.

6) Similarly, after a theft (including a branch) valve closing is detected, if the discharge flow decrease of the pump or the compressor is clearly higher than the reference 0 level, this method is still capable to detect more new thefts as following:
  a. If the detected new theft has a different theft location, then it is a new theft. Its theft details can be obtained except that the low sensors can only measure the overall flow;
  b. If the detected new theft has the same theft location as the previously detected one, then it denotes that the previously detected theft valve closing was not fully closed.

7) The minimum leak detectable by this method will be decided basically by the uncertainty of the hardware of the system.

ii. For the Filtered Pressure Waves Method in Claim 2

This method can detect pipeline small leaks, thefts and their details (excluding the leaked amount) with or without using the unsteady flow mathematical model of the subject pipeline. If not using the unsteady flow mathematical model, the required sensors can be simplified to have pressure sensors only; if using the unsteady flow mathematical model, more accurate leak location can be obtained.

Figure 2:
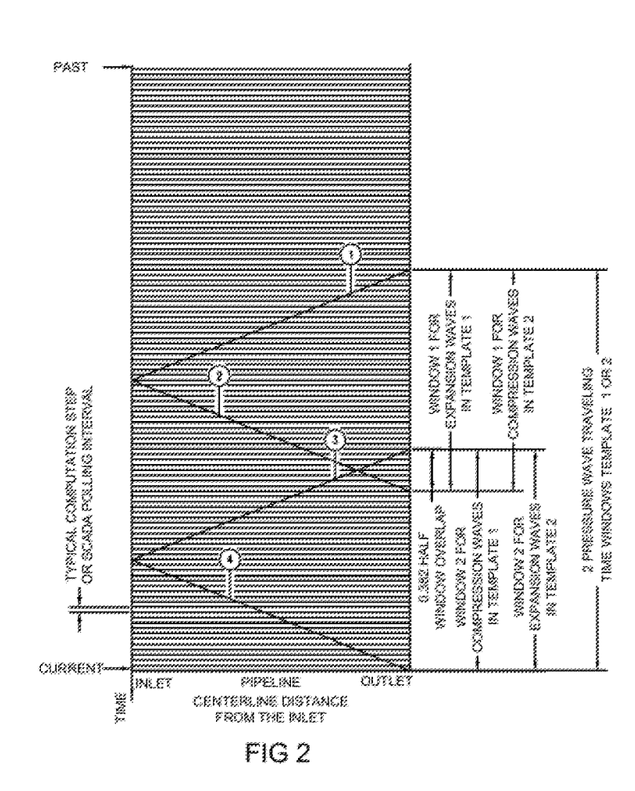
FIG. 2 is an illustration of the 2 travelling time windows template 1 and template 2.

The leaks, thefts and their details will be detected in following steps:
  1) Monitor and analyze the measured pressure data at both ends of the pipeline; register and trace all the pressure waves and filter out all those pressure waves that are originated at the inlet end or the outlet end of the pipeline so that only those pressure waves that are not originated at the ends of the pipeline will be selected as candidate pressure waves;
  2) For each computation step, consecutively apply the two travelling time windows template 1 and template 2 to those candidate pressure waves, with the 2 windows inside a template having some degree of window overlapping (recommended 0.382 of the half window overlapping when the monitored pipeline operation time is long enough), see FIG. 2 for illustration.
  From the beginning of monitoring the pipeline operation to the time when the monitored pipeline operation time is long enough, the degree of the window overlapping between window 1 and window 2 is gradually decreased from the full window to the recommended 0.382 of the half window as the monitored pipeline operation time increasing.
  3) Within each window, those candidate waves will be traced back. The intersections of such back traced waves are used for leak location calculations. Among these intersections, also filter out those intersections and related waves that belong to the leaks or thefts that already have been detected. The remaining candidate intersections should be for the new leak or theft.
  4) Using a set of thresholds (time and distance) to process the remaining candidate intersections to see whether these remaining candidate intersections are obviously in 2 separated groups. Then average the candidate intersections in each group to have the candidate leak location of that group.
  5) Among possible results, the following two are important:
    a. In a template 1 application, if the window 1 has one candidate leak location but the window 2 has two candidate leak locations, and the one candidate leak location of the window 1 and one of the two candidate leak locations from the window 2 are within a pre-set tolerance, this is a leak case. For details, this step provides one pair of estimated leak locations; and the time corresponding to the earliest intersection close to the estimated leak location (within a pre-set tolerance) in the window 1 is the estimated leak-started-time.
    b. In a template 2 application, if the window 1 has one candidate leak location but the window 2 has two candidate leak locations, and the one candidate leak location of the window 1 and one of the two candidate leak locations from the window 2 are within a pre-set tolerance, this is a theft valve (or a branch valve) closing event. For details, this step provides another pair of estimated leak locations (the first pair has been obtained when the theft valve opening has been detected as a leak), each pair are within the pre-set tolerance; and the time corresponding to the latest intersection close to the estimated theft location (within a pre-set tolerance) in the window 1 is the estimated theft-valve-closed-time (or a branch-valve-closed-time). And the difference between the theft-valve-closed-time and the leak-started-time is the theft-duration.
  6) The leaked amount will not be obtained with this method.
  7) Leaks or thefts can also be detected when fluid is stagnant for some time, since only the measured pressure data at the both ends of the subject pipeline are indispensable.

iii. For the Enhanced Filtered Pressure Waves Method in Claim 3

If the fluid is not stagnant for some time, the Filtered Pressure Waves Method in Claim 2 can be enhanced to provide the leaked amount, and to verify the leak and the leak location by utilizing the essential part of the method in Claim 1, which requires to have necessary sensors and to utilize the unsteady flow mathematical model of the subject pipeline, constructed to use the 3 dimensional centerline profile of the pipeline (may be simplified as 2 dimensional centerline profile in some applications).

The leaks, thefts and their details will be intelligently detected in following steps:
  1) Monitor and analyze the measured pressure data at both ends of the pipeline; register and trace all the pressure waves and filter out all those pressure waves that are originated at the inlet end or the outlet end of the pipeline so that only those pressure waves that are not originated at the ends of the pipeline will be selected as candidate pressure waves;

2) For each computation step, consecutively apply the two travelling time windows template 1 and template 2 to those candidate pressure waves, with the 2 windows inside a template having some degree of window overlapping (recommended 0.382 of the half window overlapping when the monitored pipeline operation time is long enough), see FIG. 2 for illustration.

From the beginning of monitoring the pipeline operation to the time when the monitored pipeline operation time is long enough, the degree of the window overlapping between window 1 and window 2 is gradually decreased from the full window to the recommended 0.382 of the half window as the monitored pipeline operation time increasing.

3) Within each window, those candidate waves will be traced back. The intersections of such back traced waves are used for leak location calculations. Among these intersections, also filter out those intersections and related waves that belong to the leaks or thefts that already have been detected. The remaining candidate intersections should be for the new leak or theft.

4) Using a set of thresholds (time and distance) to process the remaining candidate intersections to see whether these remaining candidate intersections are obviously in 2 separated groups. Then average the candidate intersections in each group to have the candidate leak location of that group.

5) Among possible results, the following two are important:
   a. In a template 1 application, if the window 1 has one candidate leak location but the window 2 has two candidate leak locations, and the one candidate leak location of the window 1 and one of the two candidate leak locations from the window 2 are within a pre-set tolerance, this is a leak case. For details, this step provides one pair of estimated leak locations; and the time corresponding to the earliest intersection close to the estimated leak location (within a pre-set tolerance) in the window 1 is the estimated leak-started-time.
   b. In a template 2 application, if the window 1 has one candidate leak location but the window 2 has two candidate leak locations, and the one candidate leak location of the window 1 and one of the two candidate leak locations from the window 2 are within a pre-set tolerance, this is a theft valve (or a branch valve) closing event. For details, this step provides another pair of estimated leak locations (the first pair has been obtained when the theft valve opening has been detected as a leak), each pair are within the pre-set tolerance; and the time corresponding to the latest intersection close to the estimated theft location (within a pre-set tolerance) in the window 1 is the estimated theft-valve-closed-time (or a branch-valve-closed-time). And the difference between the theft-valve-closed-time and the leak-started-time is the theft-duration.

6) The leak and leak details can be verified and adjusted by using the essential part of the Energy Flow Line Method in Claim 1 as following:
   a. At each computation step, also monitor the measured flow data at the outlet end of the pipeline to identify the measured phantom leak-started-time at the outlet side. Once identified, cross check with the findings in the two travelling time windows template 1 and template 2 applications;
   b. Two first leaking energy flow lines that pass the two estimated leak locations at the estimated leak-started-time will be calculated to obtain their leak verification times. The differences between the measured fluid parameters at each leak verification time and at the measured phantom leak-started-time will be used to independently calculate the two first leaking energy flow lines that pass the two estimated leak locations at the estimated leak-started-time. If any of the two estimated phantom leak-started-times and the measured phantom leak-started-time at the outlet side are within a pre-set tolerance, the leak and its details are basically verified.
   c. With the same two differences that are used for calculating leak verification times, by tracing back the first energy flow lines from the measured phantom leak-started-time at the outlet side, two adjusted estimated-leak-locations corresponding to the two estimated-leak-locations can be obtained with the assumption that the estimated leak-started-time is correct. And similarly, two adjusted estimated-leak-started-times corresponding to the two estimated-leak-locations can be obtained with the assumption that the two estimated leak-locations are correct.
   d. If any of the two adjusted estimated-leak-started-times obtained and the estimated-leak-started-time are not within the pre-set tolerance, go back to the window 1 of the template 1 application to check around the time at the corresponding estimated leak location whether there is any candidate pressure wave that has or has not an intersection to be selected. If there is, then set the corresponding time as the verified estimated-leak-started-time, and make adjustments to those related findings accordingly.
   e. The leaked fluid will be the accumulation of each measured flow difference between the two ends of each energy flow line that passes the outlet sensors after the measured phantom leak-started-time at the outlet side of the pipeline. Because the leak-started-time could be much earlier than the phantom leak-started-time at the outlet side of the pipeline, the total leaked amount can be adjusted once the estimated leak-started-time is available.
   f. For a theft case, similar verification and adjustment procedures will be applied (refer to the Energy Flow Line method in claim 1).
   g. In a theft case, the stolen amount of the fluid is the accumulation of each measured flow difference between the two ends of each energy flow line that passes the outlet sensors during the phantom leak-duration at the outlet side, for which the measured data is only between the phantom leak-started-time and the phantom theft-valve-closed-time at the outlet side but the length should be the difference between the theft verification time and the leak verification time
   h. There will be several quite closed estimated leak or theft locations (for instance, at least 4 for a leak, 8 for a theft) provided as a range for searching the leak or theft. And add certain distance (which is determined with the uncertainty of the system or past experience) to each side of the range as search-from and search-to location to form a search range.

7) If the fluid is stagnant for some time, the leaked amount will be calculated without measured data to be compared, and this method will function as same as the Filtered Pressure Waves Method in Claim 2 since the enhancement requires flow data.

iv. For the Mutual Confirmation Method in Claim 4

This method utilizes the essential part of those methods claimed in Claim 1 and 3 or 5 to extend the capability and to confirm each finding. If any result that contradicts the solution is identified, find a new one that fits. By providing the solution that is confirmed with 2 sets of leak details, sending false alarms can be avoided.

This method focuses some issues in the real time monitoring applications, especially in SCADA environments, to have shorter calculation time in intelligent leak and theft detection, which requires using an unsteady flow mathematical model that uses the three dimensional centerline profile of the pipeline (may be simplified as two dimensional centerline profile of the pipeline in some applications).

The leaks, thefts and their details will be intelligently detected in following steps:

1) For each SCADA polling cycle or computation step, read in a full set (2 groups per pipeline sector) of measured parameters: one group for simulation, the other for comparison. The results of the comparison will be weighted to form an index that will be used to check the pipeline integrity.
2) A suspect new leak will be detected if such index appears higher than a strength threshold for longer than a duration threshold, and the suspect new leak will be verified with the existence of 2 estimated leak locations that are calculated.
3) While a suspect leak is on the essential part of the Enhanced Filtered Pressure Waves Method in claim 3 will also be used. At each computation step, the index, the measured pressure data and flow data at the outlet end of the pipeline are all monitored to identify sudden changes and events such as the measured phantom leak-started-time at the outlet side etc. Once identified, cross check with the other findings so that the other new suspect leaks will be detected and verified.
4) While the fluid is stagnant, the essential part of the Filtered Pressure Waves Method in claim 2 will take over the monitoring task so that the other new suspect leaks will be detected.
5) Once the detected suspect leak is confirmed and verified, alarm will be set.
6) For each suspect leak, several calculated leak locations will be obtained by using the method similar to the Enhanced Filtered Pressure Waves Method (refer to the claim 3) to provide a search range with a search-from and a search-to location.
7) For the leak-started-time, since verified with different ways, this method can solve the worst case scenario where the initial expansion pressure wave originated by leak is only detected at one end of the subject pipeline.
8) To verify the leaked amount, a reference flow level is used, which is obtained from the average over certain steps before the leak-started-time.
9) Similarly, theft case (including a branch closing case) and its details can be detected and verified.
10) Similarly multi leaks, thefts (including branch valve closing events) and their details can be detected and verified except that only the overall flow can be measured and confirmed.
11) Leaks or thefts can also be detected when the fluid is stagnant for some time, where the leaked amount will be calculated without measured data to be compared.

While described with reference to these specific embodiments, modifications, variations and combinations of these 4 methods and related systems may be constructed without departing from the scope of the invention, which is defined in the claims section.

3. Brief Description of the Drawings

1) The line with tag 1 is the first leak energy flow line (the energy flow line that is the earliest one affected by the leak), the end of which at the outlet sensor is the phantom leak-started-time at the outlet side or end of the pipeline;
2) The line with tag 2 is the imaginary portion extended from the first leak energy flow line assuming that there is no leak, the end of which at the outlet sensor is the leak verification time;
3) The line with tag 3 is the trajectory of the first expansion pressure wave that is originated by the leaking started at the leak-started-time. The time when it arrives the inlet sensor, plus the system response time to the expansion pressure waves, will be the phantom leak-started-time at the inlet side or end of the pipeline;
4) The line with tag 4 is the last leak energy flow line (the energy flow line that is the latest one affected by the theft), the end of which at the outlet sensor is the phantom theft-valve-closed-time at the outlet side or end of the pipeline;
5) The line with tag 5 is the imaginary portion extended from the last leak energy flow line assuming that that there is no theft, the end of which at the outlet sensor is the theft verification time;
6) The line with tag 6 is the trajectory of the last compression pressure wave that is originated by the theft valve closing ended at the theft-valve-closed-time. The time when it arrives the inlet sensor, plus the system response time to compression pressure waves, will be the phantom theft-valve-closed-time at the inlet side or end of the pipeline;
7) Some other terminologies are also shown in the FIG. 1, such as theft duration, typical time frame for an energy flow line etc.

1) 2 travelling time windows template 1:
    Window 1 is for expansion pressure waves:
        The line with tag 1 is the imaginary pressure wave at the beginning of the window 1;
        The line with tag 2 is the imaginary reflected pressure wave of the pressure wave with tag 1.
    Window 2 is for compression pressure waves:
        The line with tag 3 is the imaginary pressure wave at the beginning of the window 2;
        The line with tag 4 is the imaginary reflected pressure wave of the pressure waves with tag 3.
2) 2 travelling time windows template 2:
    Window 1 is for compression pressure waves:
        The line with tag 1 is the imaginary pressure wave at the beginning of the window 1;
        The line with tag 2 is the imaginary reflected pressure wave of the pressure wave with tag 1.

Window 2 is for expansion pressure waves:
  The line with tag 3 is the imaginary pressure wave at the beginning of the window 2;
  The line with tag 4 is the imaginary reflected pressure wave of the pressure waves with tag 3.

What is claimed is:

1. A method for detecting small leaks or thefts in a pipeline, comprising the following steps:

forming energy waves in a fluid within a pipeline using a pump or a compressor which travel in the fluid towards an outlet end of the pipeline and defining an energy flow line to be the front of an energy wave which enters the inlet of the pipeline and travels along the pipeline centerline;

calculating the speed of the energy flow line;

determining the energy density loss across the leak location directly based on the leaked amount of the fluid on the energy flow line while the interest energy wave section continues to travel towards the outlet of the pipeline, and is detected by sensors at the outlet end of the pipeline, the differences between the measured flows and between the total energies at the both ends of the energy flow line providing information on the leaked amount of the fluid;

determining the energy density change across the leak location reflecting the leaked amount change on the energy flow line due to an enlarged leaking or the theft valve closing, and determining whether the theft valve is closed;

detecting pipeline leakage as follows:

monitoring the measured flow data at both ends of the pipeline to identify flow changes greater than a predetermined strength and duration that occur at different ends within a given time frame; and determining if a leak or a theft has occurred by performing following steps:

determining a phantom leak-started-time at the inlet and outlet of the pipeline when the outlet end flow decreases and the inlet end flow increases, thereby denoting a leak or a theft valve opening event;

determining a phantom theft-valve-closed time at the inlet and outlet of the pipeline when the outlet end flow increases and the inlet end flow decreases, thereby denoting a theft valve closing event; and determining if a leak has occurred by:

defining the first leaking energy flow line for a new leak as the earliest energy flow line that is affected by the new leak that passes the leak location at a leak-started-time and also passes the outlet sensors at the measured phantom leak-started-time related to the new leak at the outlet side of the pipeline;

detecting the pump response or compressor response to a first expansion pressure wave at the measured phantom leak-started-time at the inlet side of the pipeline as the first expansion pressure wave originated by the new leak passes the inlet sensors and reaches the pump or the compressor after the system response time to the expansion pressure waves with the inlet sensors;

tracing back the first leaking energy flow line and the trajectory of the first expansion pressure wave line to determine an estimated leak location and leak-starting-time based on the intersection of the two lines;

determining a leak verification time as the time that the first leaking energy flow line would be expected to pass the outlet sensors of the pipeline if no leak was present;

calculating the time difference between the leak verification time and the measured phantom leak-started-time at the outlet side to determine the size and location of the new leak and to verify the existence of the leak if the estimated and the measured phantom leak-started-time at the outlet side are within a predetermined tolerance;

determining an amount of leaked fluid based on the accumulation of each measured flow difference between the two ends of each energy flow line that passes the outlet sensors after the measured phantom leak-started-time at the outlet side of the pipeline; and when a leak is detected, if the discharge flow increase of the pump or the compressor is smaller than its tested capacity to respond leaking related expansion waves, determining if a new leak exists by:

measuring the overall flow and determining if the leak is in a different leak location, and is therefore a new leak and or if the detected new leak has the same leak location as the previously detected one determining that the previously detected leak has become larger; or determining if a theft has occurred by:

defining the last leaking energy flow line for a new theft as the latest energy flow line that is affected by the new theft that passes the theft location at the theft-valve-closed-time, and also pass the outlet sensors at the measured phantom theft-valve-closed-time related to the new theft at the outlet side of the pipeline;

detecting the pump response or the compressor response to the last compression pressure wave at the measured phantom theft-valve-closed time at the inlet side of the pipeline as the last compression pressure wave originated by the theft valve closing at the theft-valve-closed-time passes the inlet sensors and reaches the pump or the compressor;

estimating a theft location and a theft-valve-closed-time for the new theft based on their intersection of the last leaking energy flow line and the trajectory of the last compression pressure wave;

determining a theft verification time based on an expected time that the last leaking energy flow line would pass the outlet sensors of the pipeline if no theft was present;

calculating the time difference between the theft verification time and the measured phantom theft-valve-closed-time at the outlet side to determine the size and location of the new theft and verifying a theft if the estimated and the measured phantom theft-valve-closed-time at the outlet side are within a predetermined tolerance;

determining the amount of leaked fluid based on the accumulation of the measured flow difference between the two ends of each energy flow line that passes the outlet sensors during a phantom theft-duration between the phantom leak-started-time and the phantom theft-valve-closed-time at the outlet side, where the phantom theft-duration is the difference between the theft verification time and the leak verification time; and after a theft is detected, if the discharge flow decrease of the pump or the compressor is higher than a reference 0 level, detecting additional new thefts as following:

based on the measured overall flow, if the detected new theft has a different theft location, determining that it is a new theft and if the detected new theft has the same theft location as the previously detected one, determining that the previously detected theft valve closing was not fully closed.

2. A pipeline small leaks and thefts detection system, comprising:
   a pipeline;
   at least two groups of sensors positioned at both the inlet and the outlet of the pipeline to measure fluid parameters;
   a detecting station that has at least:
   a computer;
   a computer program which receives the fluid parameters measured by the sensors;
   wherein the computer program further comprises:
   an unsteady flow mathematical model of the subject pipeline that utilizes the 2 or 3 dimensional centerline profile of the pipeline; and
   implements a procedure as found in the method of claim 1.

3. A method for detecting small leaks or thefts in a pipeline, comprising:
   monitoring and analyzing the measured pressure data at both ends of the pipeline, selecting candidate pressure waves by filtering out all irrelevant pressure waves so that only those pressure waves that are not originated at the pipeline ends are selected;
   for each computation step, consecutively applying two travelling time windows template 1 and template 2 to those candidate pressure waves, wherein the 2 windows are within a template have some degree of window overlapping which gradually decreases from the full window to a selected degree during monitoring of the pipeline operation;
   detecting a new leak or theft by tracing back the candidate waves within each window and using the intersections of the back traced waves for leak location calculations, while also filtering out any intersections and related waves that belong to the leaks or thefts that have been detected previously;
   using time and distance thresholds to process the remaining candidate intersections to determine whether these remaining candidate intersections consist of 2 separated groups and averaging the candidate intersections in each group to determine the candidate leak location of that group;
   determining a leak if in the template 1 application, the window 1 has one candidate leak location but the window 2 has one or two candidate leak locations, and the one candidate leak location of the window 1 and one of the two candidate leak locations from the window 2 are within a pre-set tolerance, thereby providing one pair of estimated leak locations, and the time corresponding to the earliest intersection closest to the estimated leak location within a pre-set tolerance in the window 1 is the estimated leak-started-time;
   determining if a theft or branch valve has closed if in a template 2 application, if the window 1 has one candidate leak location but the window 2 has one or two candidate leak locations, and the one candidate leak location of the window 1 and one of the two candidate leak locations from the window 2 are within a pre-set tolerance, thereby providing another pair of estimated leak locations, and the time corresponding to the latest intersection close to the estimated theft location within a pre-set tolerance in the window 1 is the estimated theft-valve-closed-time or a branch-valve-closed-time, and the difference between the theft-valve-closed-time and the leak-started-time is the theft-duration.

4. A pipeline small leaks and thefts detection system, comprising:
   a pipeline;
   at least two groups of sensors positioned at both the inlet and the outlet of the pipeline to measure fluid parameters;
   a detecting station that has at least:
   a computer;
   a computer program which receives the fluid parameters measured by the sensors;
   wherein the computer program further comprises:
   an unsteady flow mathematical model of the subject pipeline that utilizes the 2 or 3 dimensional centerline profile of the pipeline; and
   implements a procedure as found in the method of claim 3.

5. A method for intelligently detecting small leaks and thefts in a pipeline comprising:
   monitoring and analyzing measured parameters at both ends of the pipeline and weighing them to form an index, selecting candidate pressure waves by filtering out all irrelevant pressure waves so that only those pressure waves that are not originated at the pipeline ends are selected;
   for each computation step, consecutively applying two travelling time windows template 1 and template 2 to those candidate pressure waves, wherein the 2 windows are within a template have some degree of window overlapping which gradually decreases from the full window to a selected degree during monitoring of the pipeline operation;
   detecting a new leak or theft by tracing back the candidate waves within each window and using the intersections of the back traced waves for leak location calculations, while also filtering out any intersections and related waves that belong to the leaks or thefts that have been detected previously;
   using time and distance thresholds to process the remaining candidate intersections to determine whether these remaining candidate intersections consist of 2 separated groups and averaging the candidate intersections in each group to determine the candidate leak location of that group;
   determining a leak if in the template 1 application, the window 1 has one candidate leak location but the window 2 has one or two candidate leak locations, and the one candidate leak location of the window 1 and one of the two candidate leak locations from the window 2 are within a pre-set tolerance, thereby providing one pair of estimated leak locations, and the time corresponding to the earliest intersection closest to the estimated leak location within a pre-set tolerance in the window 1 is the estimated leak-started-time;
   determining if a theft or branch valve has closed if in a template 2 application, if the window 1 has one candidate leak location but the window 2 has one or two candidate leak locations, and the one candidate leak location of the window 1 and one of the two candidate leak locations from the window 2 are within a pre-set tolerance, thereby providing another pair of estimated leak locations, and the time corresponding to the latest intersection close to the estimated theft location within a pre-set tolerance in the window 1 is the estimated theft-valve-closed-time or a branch-valve-closed-time, and the difference between the theft-valve-closed-time and the leak-started-time is the theft-duration;

at each computation step, monitoring the measured flow data and the index at the outlet end of the pipeline to identify the measured phantom leak-started-time at the outlet side and once identified, cross checking with the findings in the two travelling time windows template 1 and template 2 applications;

calculating leak verification times of two first leaking energy flow lines that pass the two estimated leak locations at the estimated leak-started-time and using the differences between the measured fluid parameters at each leak verification time and at the measured phantom leak-started-time to independently calculate the two first leaking energy flow lines that pass the two estimated leak locations at the estimated leak-started-time, wherein if any of the two estimated phantom leak-started-times at the outlet side and the measured phantom leak-started-time at the outlet side are within a pre-set tolerance, the leak and its details can be verified;

using the same two differences to obtain two adjusted estimated-leak-locations corresponding to the two estimated-leak-locations by tracing back the first energy flow lines from the measured phantom leak-started-time at the outlet side, and to obtain two adjusted estimated-leak-started-times corresponding to the two estimated-leak-locations based on the two estimated leak-locations;

wherein if any of the two adjusted estimated-leak-started-times obtained and the estimated-leak-started-time are not within a pre-set tolerance, returning to the window 1 of the template 1 at the time corresponding to the estimated leak location and setting the corresponding time as the verified estimated-leak-started-time, and using a candidate pressure wave that has not previously been used;

determining an amount of leaked fluid based on the accumulation of each measured flow difference between the two ends of each energy flow line that passes the outlet sensors after the measured phantom leak-started-time at the outlet side of the pipeline; and in the case of a theft, determining the amount of leaked fluid based on the accumulation of the measured flow difference between the two ends of each energy flow line that passes the outlet sensors during a phantom theft-duration between the phantom leak-started-time and the phantom theft-valve-closed-time at the outlet side, where the phantom theft-duration is the difference between the theft verification time and the leak verification time.

6. A pipeline small leaks and thefts detection system, comprising:

a pipeline;

at least two groups of sensors positioned at both the inlet and the outlet of the pipeline to measure fluid parameters;

a detecting station that has at least:

a computer;

a computer program which receives the fluid parameters measured by the sensors;

wherein the computer program further comprises:

an unsteady flow mathematical model of the subject pipeline that utilizes the 2 or 3 dimensional centerline profile of the pipeline; and implements a procedure as found in the method of claim 5.

* * * * *